United States Patent [19]

Hake

[11] 4,042,045
[45] Aug. 16, 1977

[54] MULTIPLE SECTION FARM IMPLEMENT WITH BIASED SWINGING ARM STRUCTURE FOR ATTACHING REINFORCING MEMBER TO MAIN FRAME

[75] Inventor: Kenneth A. Hake, Tipton, Kans.

[73] Assignee: Kent Manufacturing Co., Inc., Tipton, Kans.

[21] Appl. No.: 589,127

[22] Filed: June 23, 1975

[51] Int. Cl.² .............................................. A01B 73/00
[52] U.S. Cl. ..................................... 172/311; 172/456; 280/411 A
[58] Field of Search ............... 172/311, 452, 456, 458, 172/459, 476, 482, 491, 776; 280/411 R, 411 A, 412, 413, 638, 639; 16/147; 292/201, 240, 246, 248, 249, 250

[56] References Cited

U.S. PATENT DOCUMENTS

| | | | |
|---|---|---|---|
| 3,414,064 | 12/1968 | Foster | 172/311 |
| 3,539,016 | 11/1970 | Bauer et al. | 172/311 |
| 3,548,954 | 12/1970 | Lindemann | 172/311 |
| 3,637,027 | 1/1972 | Kovar | 172/311 |
| 3,640,345 | 2/1972 | Sosalla | 172/311 |
| 3,700,040 | 10/1972 | Sosalla et al. | 172/311 |
| 3,960,221 | 6/1976 | Blair et al. | 172/311 |

*Primary Examiner*—Richard T. Stouffer
*Attorney, Agent, or Firm*—Fishburn, Gold & Litman

[57] ABSTRACT

In an earth working implement having a wing frame which is rearwardly foldable, and with elongated, flexible cables which extend rearwardly and outwardly from a main frame of the implement to the outer ends of the wing frame, apparatus is provided for preventing slackening of the flexible cables when the wing frame is folded from an operating configuration to a transporting configuration, or vice versa. The flexible cables are thus kept from sagging to the ground and tangling during folding and unfolding of the implement. One end of each of the cables is attached to the outer end of an arm member, with the inner end of the arm members being pivotally attached to the main frame for back and forth pivoting of the arms. When the wing frame is in the operating configuration, the arm members are folded forwardly and inwardly and the outer ends thereof are latched by a yoke pivotally attached to the main frame. The arms are unlatched and swing outwardly and rearwardly when the wing frame is folded rearwardly and inwardly to a transport configuration.

12 Claims, 4 Drawing Figures

MULTIPLE SECTION FARM IMPLEMENT WITH BIASED SWINGING ARM STRUCTURE FOR ATTACHING REINFORCING MEMBER TO MAIN FRAME

BACKGROUND OF THE INVENTION

The present invention pertains to farm implements and more particularly to multiple-section farm implements which have a rearwardly foldable wing frame that is stabilized against yawing during a soil cultivating operation by means of elongated, flexible reinforcing members, such as cables or chains, which extend from the main frame to the outer ends of the wing frame. More specifically, the present invention pertains to improved apparatus for attaching the aforesaid flexible reinforcing members to a main frame of the implement whereby stabilization of the wing frame against damaging or destructive yaw is assured during a cultivating operation, while also assuring that the flexible reinforcing members do not sag and become tangled, either during folding of the wing frame or during transportation of the implement to another location.

Farm implements of the type just described are relatively wide and became available upon commercialization of the large tractors which are needed for towing them. The wing frame can be folded rearwardly to reduce the width of the implement during transportation from one location to another, hence permitting passage through gates, pulling along highways, etc.

The wing frame, when unfolded to an operating configuration, is stabilized against destructive yaw by means of flexible reinforcing members which are secured to the outer ends of the wing frame and to the main frame toward the front end thereof. Reinforcing members such as cables or chains tend to go slack upon folding the implement, and thus sag when the wing frame is folded, unless slack-preventive means are provided. Otherwise, the flexible reinforcing members will drag on the ground and can become tangled or else snagged on obstacles which would otherwise be cleared when folding the wing frame or during transportation of the implement to another location.

It is therefore an object of the present invention to provide an improved multiple-section earth working implement having a rearwardly foldable wing frame.

Another object is to provide means for attaching flexible reinforcing members, such as chains or cables, to the main frame of the aforesaid type of earth working implement.

Still another object is to provide means which prevent slackening of the flexible reinforcing members during folding or unfolding of the wing frame of the aforesaid type of earth working implements.

Yet another object is to provide means for latching the flexible reinforcing members at a selected location on the main frame of an earth working implement of the aforesaid type, and whereby said members can be unlatched for rearward movement while fully extended, to thus prevent the sagging thereof.

Even another object is to provide a latching means of the aforesaid type whereby unlatching occurs automatically when the wing frame of the implement is raised to an intermediate configuration just prior to being folded to a transporting configuration.

These and other objects and advantages of the invention will become more fully apparent from the following description and the appended claims.

SUMMARY OF THE INVENTION

The present invention is an improvement in multiple section farm implements of the general type having a main frame and a wing frame that is rearwardly foldable from an operating configuration to a transporting configuration, with the wing frame being adapted for mounting of soil conditioning members thereon and having elongated, flexible reinforcing members attached thereto which extend to the main frame.

In accordance with the present invention, swinging arm members are pivotally attached at their inner ends to the main frame of the implement and are pivotable forwards and backwards with respect to the main frame when the wing frame is folded, respectively, to an operating and a transporting configuration. One end of each of the flexible reinforcing members is attached to the outer end of one of the arm members.

Biasing means, such as tensioned springs, are attached to the arm members so that they resist rearward pivoting during folding of the wing frame to a transporting configuration. These same biasing means also urge the arm members to pivot forwardly when the wing frame is folded back into an operating configuration from a transporting configuration.

Latching means is also provided whereby the pivotable arm members are in a forwardly pivoted position when the wing frame is in an operating configuration, and whereby the arm members are unlatched for pivoting during folding of the wing frame.

The present apparatus arrangement provides effective stabilization of the wing frame against yaw during operation of the implement, but upon the unlatching of the arm members the entire length of the flexible reinforcing members is allowed to shift back and forth upon rearward and forward folding, respectively, of the wing frame. Use of the biased pivotal arm members permits folding to occur in either direction without sagging of the reinforcing members to the ground.

DESCRIPTION OF PREFERRED AND ALTERNATIVE EMBODIMENTS

Figure 1:
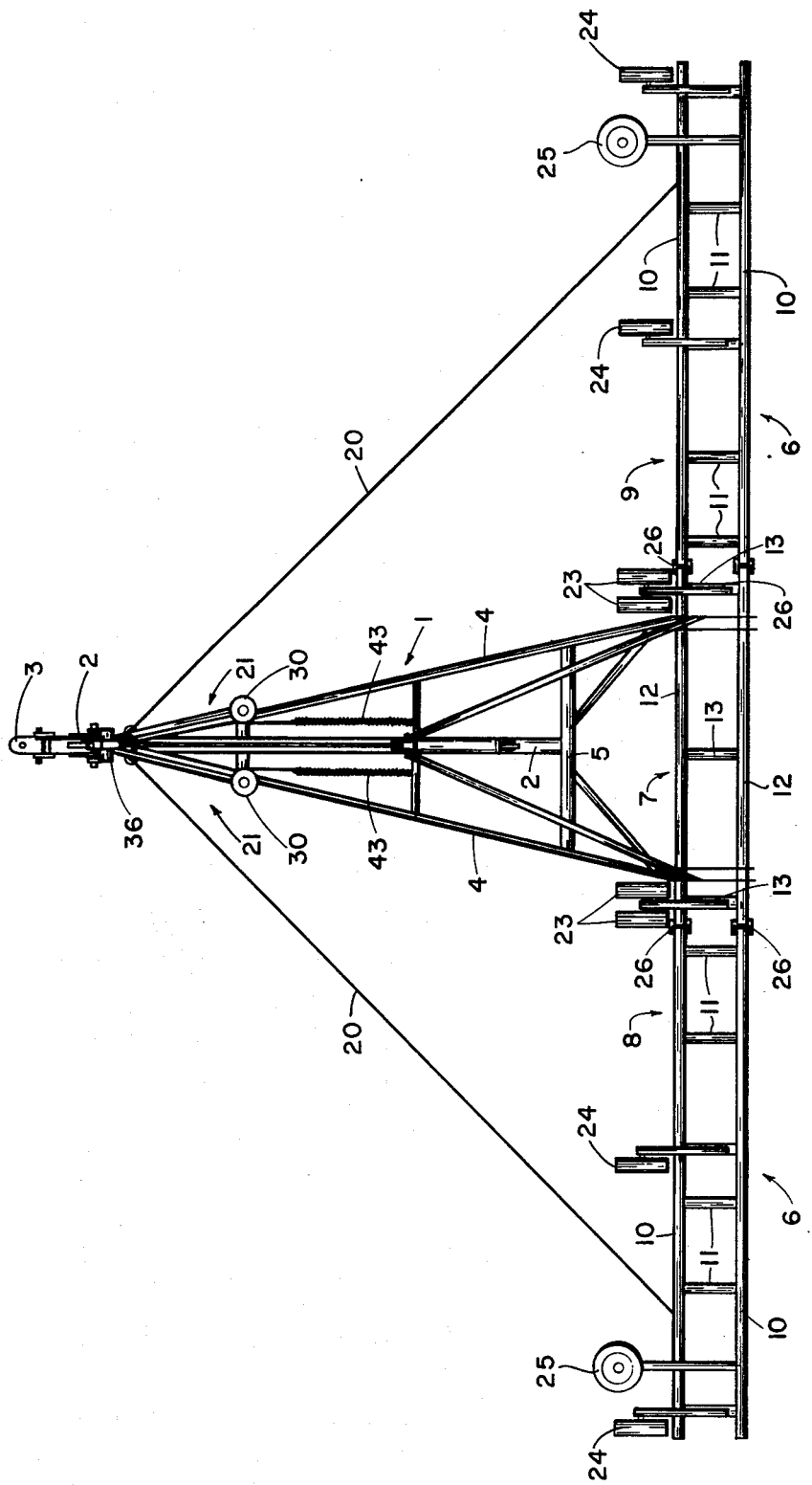
FIG. 1 is a top view of a multiple section earth working implement constructed in accordance with the present invention and shows the implement in an operating configuration.

In FIG. 1, the multiple section earth working implement is shown in an operating configuration. The main frame of the cultivator, generally represented at 1, is normally horizontally disposed and includes a tongue 2 having a towing hitch 3, two sides 4 attached to the tongue toward the front end thereof and which diverge as they extend rearwardly, and a cross-brace 5 for stabilizing the sides and to which the rear end of the tongue 2 is attached.

The elongated, transversely extending wing frame is generally represented at 6, beng pivotally attached transversely to the rear end of the main frame and disposed horizontally in the operating configuration. The wing frame has a central wing section, represented at 7, and outer wing sections, represented at 8 and 9, pivotally attached at each end of the central section. The outer wing sections each have a pair of side members 10 which are spaced apart and connected to each other by means of cross braces 11. Similarly, the central wing section 7 has side members 12 and cross member 13. The side members 19 and 12 are provided with drilled holes therein (not shown) for the mounting of earth engaging elements along the length of the wing frame by means of nuts and bolts.

Through pivotal attachment to the main frame, the wing frame can be pivoted upward and forward to a vertical position from the operating configuration shown in FIG. 1. This vertical positioning of the wing frame provides an intermediate configuration which exists prior to folding of the outer wing frames rearwardly and inwardly to the transport configuration shown in FIG. 2.

Figure 3:
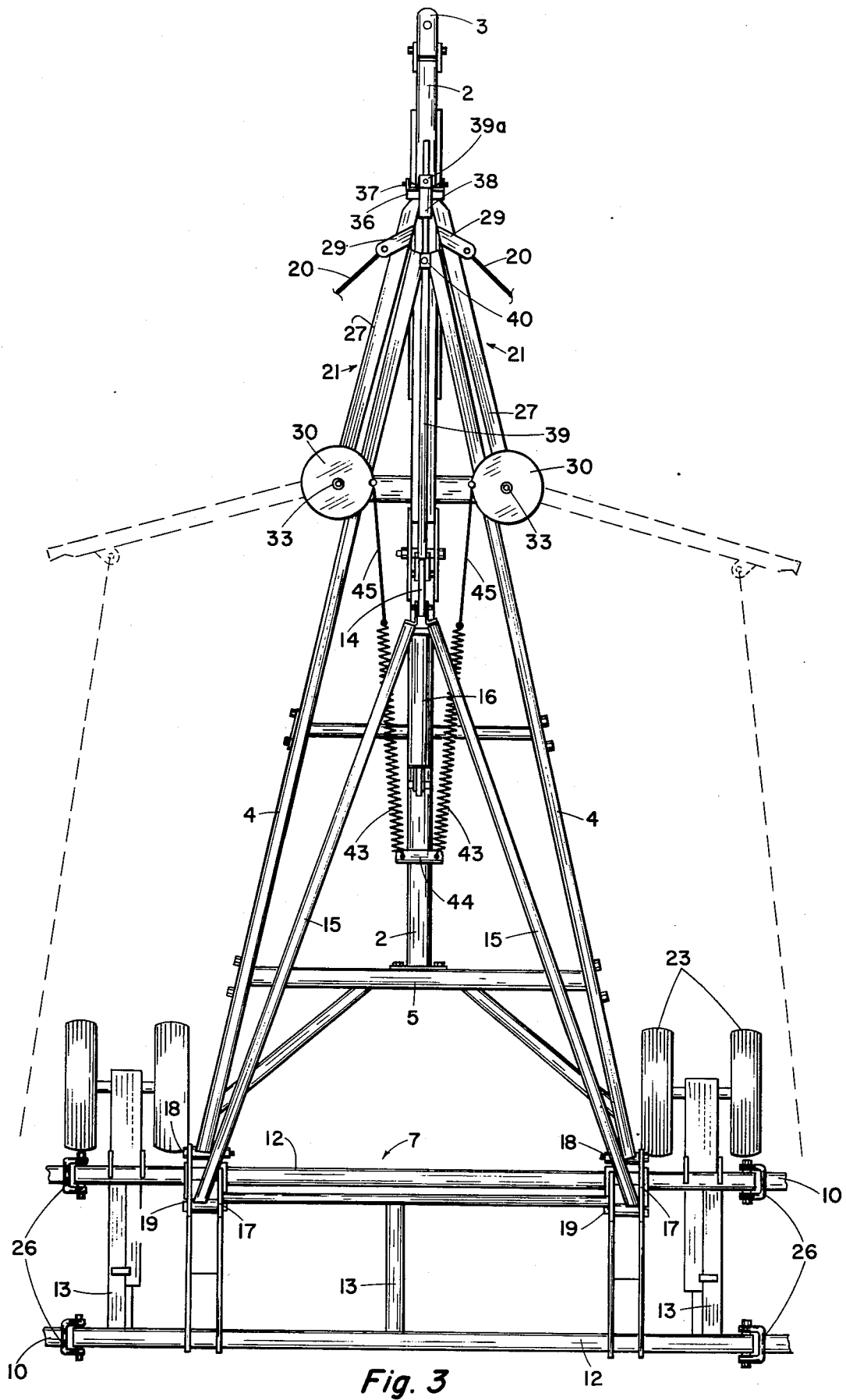
FIG. 3 is a top view of one embodiment of a main frame and central section of a wing frame that can be employed with the implement shown in FIGS. 1 and 2.
Figure 4:
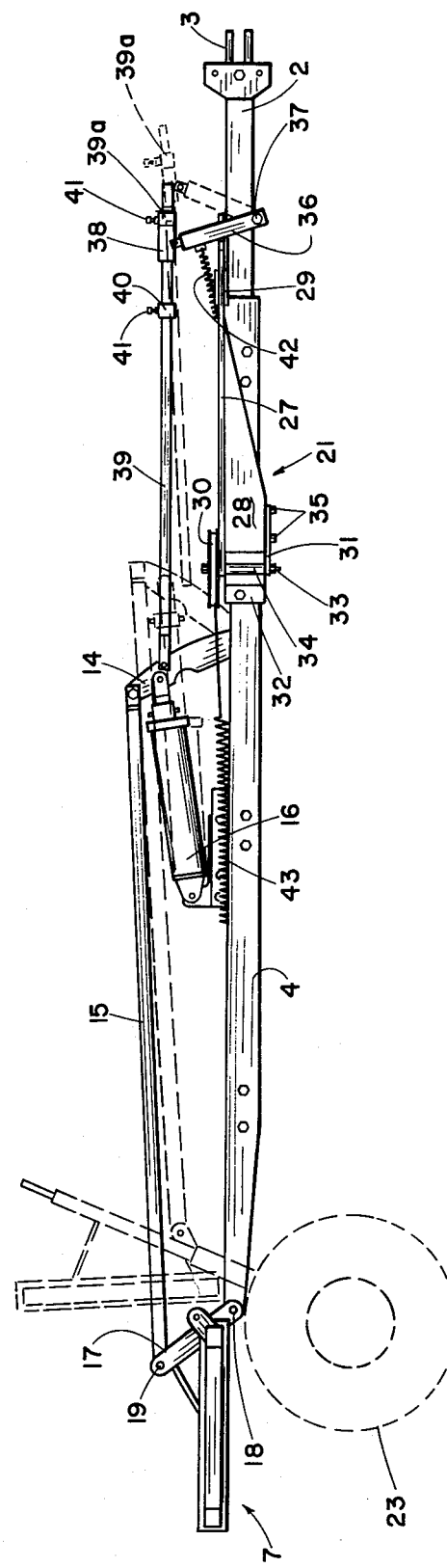
FIG. 4 is a side view of the apparatus shown in FIG. 3.

It can be seen from FIGS. 3 and 4 that upward and forward pivoting of the wing frame is accomplished by means of a lifting tower which comprises an upright lever 14 pivotally attached at its lower end to the tongue 2 of the main frame, and two interconnecting links 15 which are pivotally attached at one of their ends to the lever 14 while being pivotally attached to the wing frame at their other ends. The lever 14 can be moved back and forth on its pivot by any suitable means, but a hydraulic cylinder 16 can be used to advantage. Hydraulic pressure can be supplied from the towing vehicle and can be controlled by the operator thereof for effecting actuation of the cylinder. Positioning of the wing frame in the operating configuration is illustrated by the solid lines in FIG. 4 whereas positioning in the intermediate configuration is illustrated by the dotted lines. Pivotal attachment of the wing frame to the main frame, and the interconnecting links 15 of the lifting tower to the wing frame, is through pivot links 17 which are rigidly secured to a side member 12 of the central wing section 7. The rear ends of the main frame sides 4 are attached to a lower pivot point on the pivot links 17 by means of pivot pins 18, whereas the rear ends of interconnecting links 15 are attached to an upper pivot point on the links by means of pivot pins 19.

In the drawings, the flexible reinforcing members 20 are steel cables and will hereinafter be referred to as "reinforcing cables", or more simply as "cables", even though other flexible members such as chains could be used. As was previously indicated, the purpose of the cables is to stabilize the elongated wing frame against yaw when it is in the fully extended operating configuration. Accordingly, one end of the cables 20 is attached to the main frame and the cables extend outwardly and rearwardly therefrom and are attached at their other end to an outer section of the wing frame. Advantageously, the cables are attached to the main frame toward the front end thereof and to the outer wing sections toward the terminus thereof. As shown in the drawings, the cables are attached at their front ends to the outer ends of arm members 21. The arm members are pivotally attached at the inner ends to the sides 4 of the main frame, and the rear ends of the cables are connected to the outer ends of outer wing sections 8 and 9 by means of rear attachment links 22.

Both the main frame and the wing frame are provided with wheels on which the implement rolls when being towed. The main frame 1 has wheels 23 with rotational axes that extend transversally with respect to the longitudinal axis of the main frame. These wheels 23 roll over the ground when the implement is towed with the wing frame in either the operating or the transporting configuration. The wing frame is provided with wheels 24 with rotational axes aligned with those of the main frame and which roll over the ground when the wing frame is towed in the operating configuration. It should be noted, however, that still other wheels, i.e. trail wheel 25, are mounted on the outer wing sections 8 and 9 and that the rotational axes of these wheels are transversally oriented to those of the wheels 24. When the wing frame is in the operating configuration shown in FIG. 1, the wheels are out of contact with the ground, but when the wing frame is raised to an intermediate configuration, wherein the wing frame assumes a vertical position as is illustrated by the dotted lines in FIG. 4, the wheels 25 come into contact with the ground during raising of the wing frame, and the continued raising thereof to the vertical position causes wheels 24 to be raised out of contact with the ground since the outer ends of the wing frame are caused to cant upward. This upward levering of the ends of the wing frame is a result of the fact that the downward extension of trail wheels 25 from the wing frame is greater than that of wheels 24.

With the wing frame in the intermediate configuration, forward towing of the implement causes the outer wing sections 8 and 9 to pivot rearwardly on pivot joints 26 since forward movement of the outer sections is resisted by the transversal orientation of the trail wheels 25, so that the outer sections continue to pivot rearwardly until the rotational axes of the trail wheels come into parallel alignment with those of the main frame wheels 23. Accordingly, the trail wheels 25 are relied upon for pivoting of the wing frame, and they are in rolling contact with the ground when the wing frame is in a transport configuration whereas the wheels 24 have then been raised out of contact with the ground.

Figure 2:
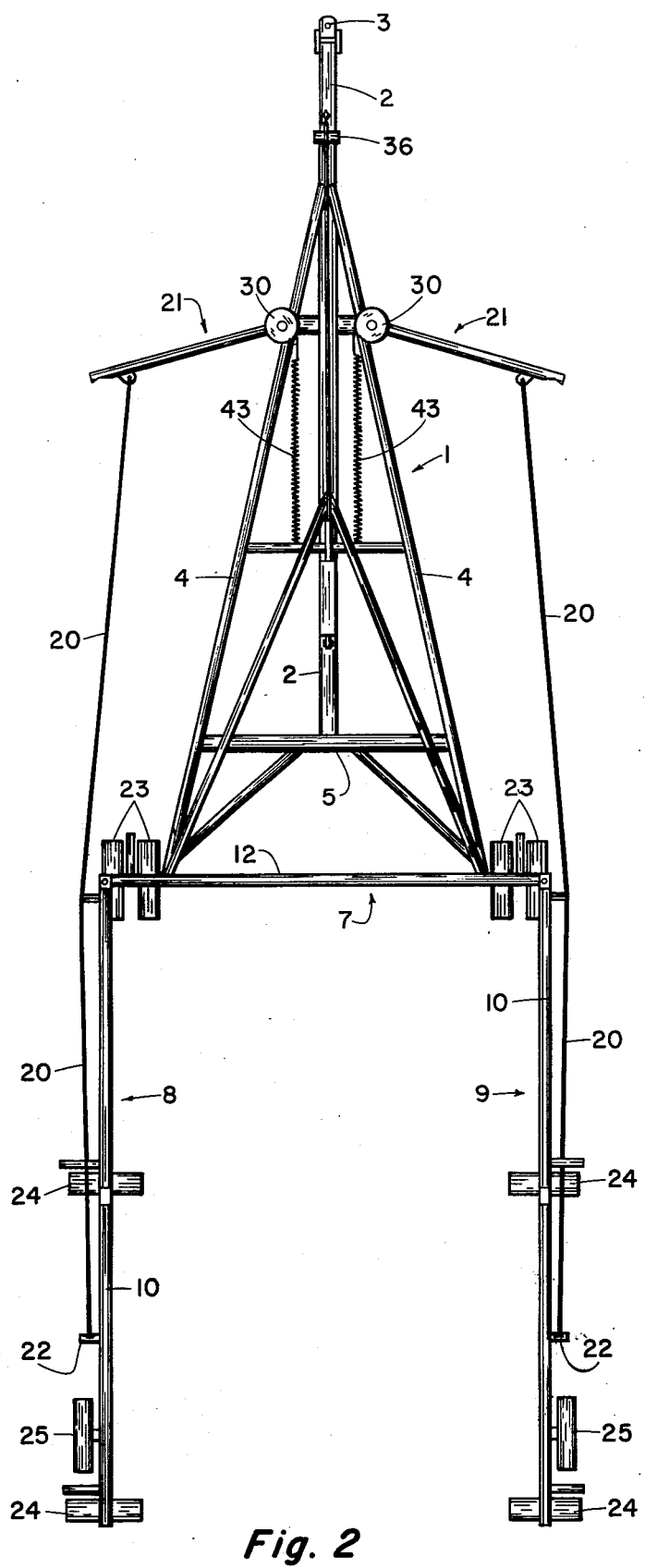
FIG. 2 is a top view of the same implement as in FIG. 1, but shows the implement in a transporting configuration.

Further reference to FIGS. 1 and 2 will reveal that folding of the wing frame from the operating to the transporting configuration cannot take place unless the swinging arm members 21 are free to pivot rearwardly since rearward folding of the wing frame requires that the front and rear ends of cables 20 be able to shift rearwardly from where they are positioned during an operating configuration. Conversally, the wing frame would not be stabilized against damaging yaw during the operation of the implement unless each end of the cables 20 is secured against rearward movement. Beyond this, the cables 20 would slacken and sag to the ground during either rearward folding of the wing frame to a transporting configuration or during forward folding thereof to an operating configuration. Details are shown in FIGS. 3 and 4 of an apparatus arrangement whereby the cables 20 are automatically secured and unsecured at the appropriate times, and also by means of which slackening of the cables is automatically prevented as it tends to occur.

In FIGS. 3 and 4, the swinging arms 21 comprise a boom 27 in the form of a plate which extends along a horizontal plane, a stiffener plate 28 attached to lower side of the boom and which extends along a vertical plane, forward attachment links 29 for securing the cables 20 to the swinging arms, a drum 30 attached to the boom and which has a vertically extending central axis, and a mounting bracket 31 on the underside of the arm. Another bracket 32 is attached on the side member 4 of the main frame for attachment of the swinging arm thereto. A pivot pin 33, in the form of a bolt which is secured in place by a locking nut, extends through the central axis of the drum 30, the inner end of the boom 20, a channel 34 in bracket 32, and mounting bracket 31. Bolts 35 extend through slots in bracket 31 and are screwed into stiffener plate 28 to provide means for vertically aligning the outer ends of the swinging arms with latching means which will be described hereinafter. When the bolts 35 are loosened, the outer ends of the arms can be moved up or down slightly to a selected position in which the arm is held until the bolts are retightened to secure the arms in the position selected.

As was previously indicated, means are provided for automatically latching and unlatching the outer ends of the swinging arms for securing and unsecuring the cables 20 during operation and when folding the wing, respectively, and for preventing slackening of the cables during folding. The forked end of a yoke 36 is pivotally secured to the front end of the tongue 2 of the main frame by pivot pin 37. A yoke sleeve 38 is pivotally attached to the upper end of the yoke. Actuator rod 39, pivotally attached at one end to lever 14, extends forwardly and through the central opening of the yoke sleeve 38. A front yoke-engagement member 39a and a rear yoke-engagement member 40 are attached to the rod on either side of the yoke sleeve. The yoke-engagement members are slidable on rode 39, but are normally secured thereon at a selected location by means of lock bolts 41. The rod 39 is thus free to move through the central opening of the yoke sleeve along a length of the rod defined by the yoke-engagement members, i.e. along the length between the members. Accordingly, the yoke is engaged by the front engagement member when the wing frame is in an operating configuration and is engaged by the rear member when the wing frame is in an intermediate configuration. A tensioned spring 42 is attached at one end to the main frame and to yoke 36 at the other end in order to facilitate rearward return of the yoke from a forwardly pivoted position.

In FIGS. 3 and 4, the positions of the swinging arms 21 and the various components of the latching apparatus when the wing frame is in an operating configuration are represented by the solid lines, whereas the dotted lines represent the position of these parts during a transporting configuration.

When the wing frame is in an operating configuration, the lever 14 of the lifting tower is in a rearward position, so that yoke 36 is pulled rearward by the actuator rod 39. It should be noted that the outer ends of booms 27 are notched so as to fit inside of the fork of the yoke and be latched thereby in a forwardly pivoted position when the yoke is pivoted rearward. The yoke thus extends over the approximated forward ends of arms 21 for the latching thereof when they are pivoted all the way forward so that outer ends thereof are proximal to each other. When the wing frame is raised to a vertical position by means of the lifting tower, lever 14 is in a forward position and the yoke 36 is also pushed forward and thus pivoted away from the ends of the arms by rod 39. This unlatches arms 21 so that they can pivot backwards.

It will be appreciated, however, that the swinging arms cannot be allowed to pivot freely, either backward or forward, if full extension of the cables 20 is to be maintained and the slackening thereof thus prevented. Baising means is thus provided in the form of coiled springs 43 whereby rearward pivoting of the swinging arms is partially resisted during folding of the wing frame to a transport configuration, and also whereby the arm members are urged to pivot forwardly when the wing frame is being folded to an operating configuration. The springs 43 are attached at one end to a spring mount 44 on the tongue 2 of the main frame. The other end of the springs is attached to one end of a flexible interconnecting link 45 in the form of a steel cable, and the other end of the interconnecting cable is attached to the circumferential periphery of drum 30. When the swinging arms 21 pivot rearwardly, cables 45 become partially wound on the periphery of the drum and unwind therefrom when the arms pivot forwardly.

To fold the implement from an operating configuration to a transporting configuration, the wing frame is first raised to an intermediate configuration by means of the lifting tower. This results in forward pivoting of the yoke so that the swinging arms become unlatched for rearward pivoting, but pivoting of the arms is restrained by the coil springs until they are pulled rearward by the cables upon rearward folding of the wing frame, with this being accomplished by towing the implement forward once the trial wheels have come into contact with the ground and the swinging arms have been unlatched. Since the coil springs are attached to the swinging arms, their rearward pivoting is partially resisted by tension of the springs even during their being pulled rearward by the cables. The purpose of this resistance during pivoting of the arms is to hold tension on the cables so that they remain fully extended and hence do not slacken. It will thus be appreciated that the coiled springs or other biasing means for the swing arms must exert sufficient tension on the arms to prevent slackening of the cables when the arms pivot.

It should be pointed out that when using an arm latching means as illustrated in the drawings, raising of the wing frame to an intermediate configuration and folding thereof to a transporting configuration can be accomplished without having to stop forward motion of the implement, provided the yoke-engagement members on the actuator rod are properly positioned thereon with respect to the yoke, so that the swinging arms become unlatched by forward pivoting of the yoke just before or at the time the trail wheels on the wing frame contact the ground. Otherwise, if the arms have not been unlatched, damaging drag may result when the trail wheels touch the ground in a non-rollable orientation while the implement is in motion. It has been found, however, that such a timely unlatching of the yoke can be assured by adjustment of the yoke-engagement members on the actuator rod while the implement is not being towed.

To fold the implement to an operating configuration from a transporting configuration, the implement is pushed backward so that outward, transverse extension of the outer wing frame sections is facilitated by non-rotation of the trail wheels until the wing is fully extended and has reached an intermediate configuration, and at which time the swinging arms have pivoted all the way forward. Latching of the forwardly pivoted arms is then automatically accomplished when the wing frame is lowered to the operating configuration by means of the wing tower, i.e. the yoke is pivoted rearwardly by its actuator rod so that the fork of the yoke straddles the outer ends of the arms. During forward folding of the wing frame from a transport configuration to an intermediate and thence to a transport configuration, the swinging arms are continuously urged to pivot forward by means of the coil-spring baising means so that slack in the cables tends to be taken up as rapidly as it occurs.

The drawings illustrate use of two swinging arms 21 and two respective cables 20, but it will be understood that more or only one swinging arms can be used and that more than one cable can be attached to one arm. In addition, biasing means other than coiled springs can be used for resisting rearward pivoting of the arms and for urging them to pivot forward, i.e. tensionable elastic bands of flexible leaf springs can be used, and each arm can be provided with more than biasing means.

Even though the present invention has been described with reference to particular apparatus, arrangements thereof, configurations, and certain specific alternatives, it will nonetheless be understood that still other embodiments will become apparent which are within the spirit and scope of the invention defined in the following claims.

What is claimed and desired to secure by Letters Patent is:

1. In a multiple section farm implement having a main frame and a wing frame which is rearwardly foldable from an operating configuration to a transporting configuration, and vice versa, said wing frame being adapted for mounting of soil conditioning members thereon and having elongated, flexible reinforcing members attached thereto which extend to said main frame, the improvement for attaching said reinforcing members to said main frame, comprising:
    a. swinging arm members each having an inner end thereof pivotally attached to the main frame, and an outer end thereof attached to one end of one of said reinforcing members at a point of connection; said arms rotating laterally of said main frame along a normally substantially horizontal plane; said arm members being pivoted forwardly wherein each point of connection is disposed adjacent to said main frame in an operating configuration, and being pivoted rearwardly wherein each point of connection is spaced apart from said main frame in a transporting configuration;
    b. biasing means whereby rearward pivoting of said arm members is partially resisted during folding of the wing frame to a transporting configuration, and whereby each arm member point of connection is urged to pivot forwardly to a position adjacent to said main frame when said wing frame is folded to an operating configuration; and
    c. latching means whereby said arm members are latched in said operating configuration and unlatched for pivoting each reinforcing member point of connection outwardly of said main frame during the folding of said wing frame to said transporting configuration.

2. Apparatus as in claim 1 wherein said wing frame is horizontally disposed in said operating configuration and is pivotally attached to the rear end of said main frame, and said flexible reinforcing members extend rearwardly and outwardly from the main frame to the outer ends of the wing frame.

3. Apparatus as in claim 2 wherein said wing frame has a central wing section and an outer wing section on each end of the central section, each of said outer sections being pivotally attached to said central section, the whole of said wing frame being pivotable upwardly and forwardly to an intermediate configuration wherein said wing frame is vertically disposed, said outer wing sections being pivotable rearwardly and inwardly to a transport configuration when the wing frame is in an intermediate configuration.

4. Apparatus as in claim 3 wherein said central wing section has attached wheels which roll over the ground when the wing frame is in the operating and intemediate configurations, each of said outer wing sections having a first wheel which rolls over the ground when the wing frame is in an operating configuration and a second wheel which has an axis transversally oriented to that of said first wheel, said second wheel being out of contact with the ground when the wing frame is in an operating configuration, and whereupon rotating the wing frame to an intermediate configuration said second wheels contact the ground and said first wheels are raised out of contact with the ground, and wherein said second wheels are in rolling contact with the ground when the wing frame is in the transporting configuration.

5. Apparatus as in claim 1 wherein:
    a. said swinging arms each comprise an elongate plate extending along a horizontal plane.

6. Apparatus as in claim 1 wherein:
    a. said main frame includes a tongue disposed centrally thereof; and
    b. said latching means includes a Y-shaped yoke having an upstanding medial portion and a pair of legs connected therewith; said yoke legs being positioned on opposing sides of said tongue and pivotally connected therewith; said yoke being positioned adjacent to a forward end of said tongue whereby said yoke legs extend over the outer ends of said arm members for the latching thereof, and being pivoted away from said ends for unlatching the arm members.

7. Apparatus as in claim 6 and further comprising:
    a. a lifting tower on said main frame for pivoting the wing frame thereon to a vertical position, said lifting tower including a lever pivotally attached at one end to the main frame, an interconnecting link which is pivotally attached to said lever toward the other end thereof, said link extending rearwardly from said lever and being pivotally attached at its rear end to the wing frame, and
    b. an actuator rod which is pivotally attached at one end to said lever and is in operational engagement with said yoke at the other end, the yoke being pivotal back and forth by said rod for unlatching said arm members upon pivoting the wing frame from an operating configuration to an intermediate configuration, and for latching said arm members when said wing frame is folded to an operating configuration.

8. Apparatus as in claim 1 wherein said biasing means are springs.

9. Apparatus as in claim 8 wherein said springs are coiled springs, one end of the springs being attached to the main frame and the other end thereof being attached to said arms, and wherein said springs become extended when said arm members are pivoted rearwardly.

10. Apparatus as in claim 1 including:
    a. a drum connected with each of said arm members and disposed adjacent to the inner end thereof;
    b. a flexible interconnecting link connected with each of said drums, having one end thereof attached to said drum and the other end thereof connected with said biasing means whereby rotation of said arm members rearwardly partially winds said interconnecting link on a peripheral portion of said drum.

11. Apparatus as in claim 10 wherein said biasing means comprises a pair of coiled springs each connected with a different one of said interconnecting links.

12. Apparatus as in claim 10 wherein said flexible interconnecting links are cables.

* * * * *